INVENTOR.
OTHO D. GRANDSTAFF
BY Wm Walter Owen
ATTY.

Jan. 26, 1954

O. D. GRANDSTAFF 2,667,632

ELECTRONIC RINGING CURRENT GENERATOR

Filed June 13, 1952

4 Sheets-Sheet 2

INVENTOR.
OTHO D. GRANDSTAFF

BY McWalter Owen.

ATTY.

Jan. 26, 1954 O. D. GRANDSTAFF 2,667,632

ELECTRONIC RINGING CURRENT GENERATOR

Filed June 13, 1952

4 Sheets-Sheet 3

INVENTOR.
OTHO D. GRANDSTAFF

BY McWalter Owen.

ATTY.

Jan. 26, 1954

O. D. GRANDSTAFF 2,667,632

ELECTRONIC RINGING CURRENT GENERATOR

Filed June 13, 1952

4 Sheets-Sheet 4

INVENTOR.
OTHO D. GRANDSTAFF

BY Wm. Walter Owen

ATTY.

Patented Jan. 26, 1954

2,667,632

UNITED STATES PATENT OFFICE 2,667,632

ELECTRONIC RINGING CURRENT GENERATOR

Otho D. Grandstaff, Oak Park, Ill., assignor to Automatic Electric Laboratories, Inc., Chicago, Ill., a corporation of Delaware Application June 13, 1952, Serial No. 293,293

10 Claims. (Cl. 340—351)

This invention relates to ringing current generators and is specifically directed to an electronic ringing current generator for use in a telephone system, and having incorporated therein the ring back tone facilities, capable of supplying a series of ringing frequencies to a series of ringers individually responsive to a particular frequency.

An object of the invention is to provide an electronic generator capable of generating a series of ringing frequencies which are mixed with a ring back tone frequency and the composite signal is amplified to desirable proportions.

Another object of the invention is to use an oscillator for generation of the ring back tone frequency which is controlled and operated by a modulating oscillator.

Another object is to provide suitable means for switching the ringing oscillator from one tuned circuit to another in such a manner as to preclude the accidental connection of two successive tuned circuits to cause the ringing oscillator to generate a sub-harmonic frequency.

Another object is to provide suitable means for switching the various frequency signals to their properly associated lines and to prevent the accidental connection of one frequency to more than one line.

A further object consists of the incorporation of a non-linear resistor responsive to voltage changes to eliminate transient voltages due to switching from one frequency to another.

Another object is to provide a ring back tone of such frequency and magnitude as to give a uniform aural signal to the calling subscriber and to eliminate the faults due to cross-coupling with other lines which are in close vicinity.

Another object is to provide a signal output from the unit which will remain essentially uniform in magnitude irrespective of the loading imposed thereon.

Other objects and advantages will appear from the following description and the accompanying drawing consisting of four figures.

Figure 1:
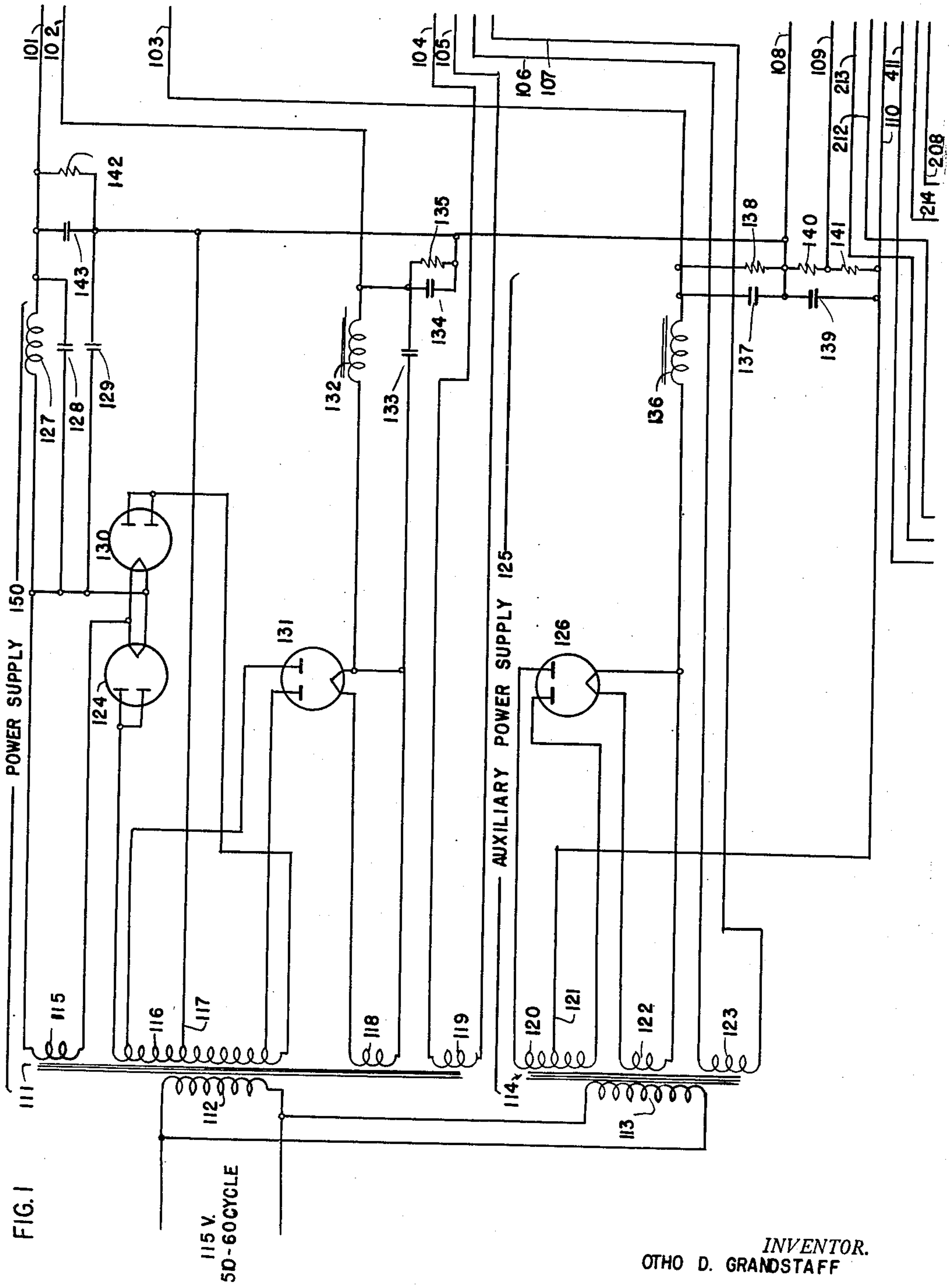
Figure 1 shows the circuits of the three rectifier stages used to supply power to the various stages of the unit.
Figure 2:
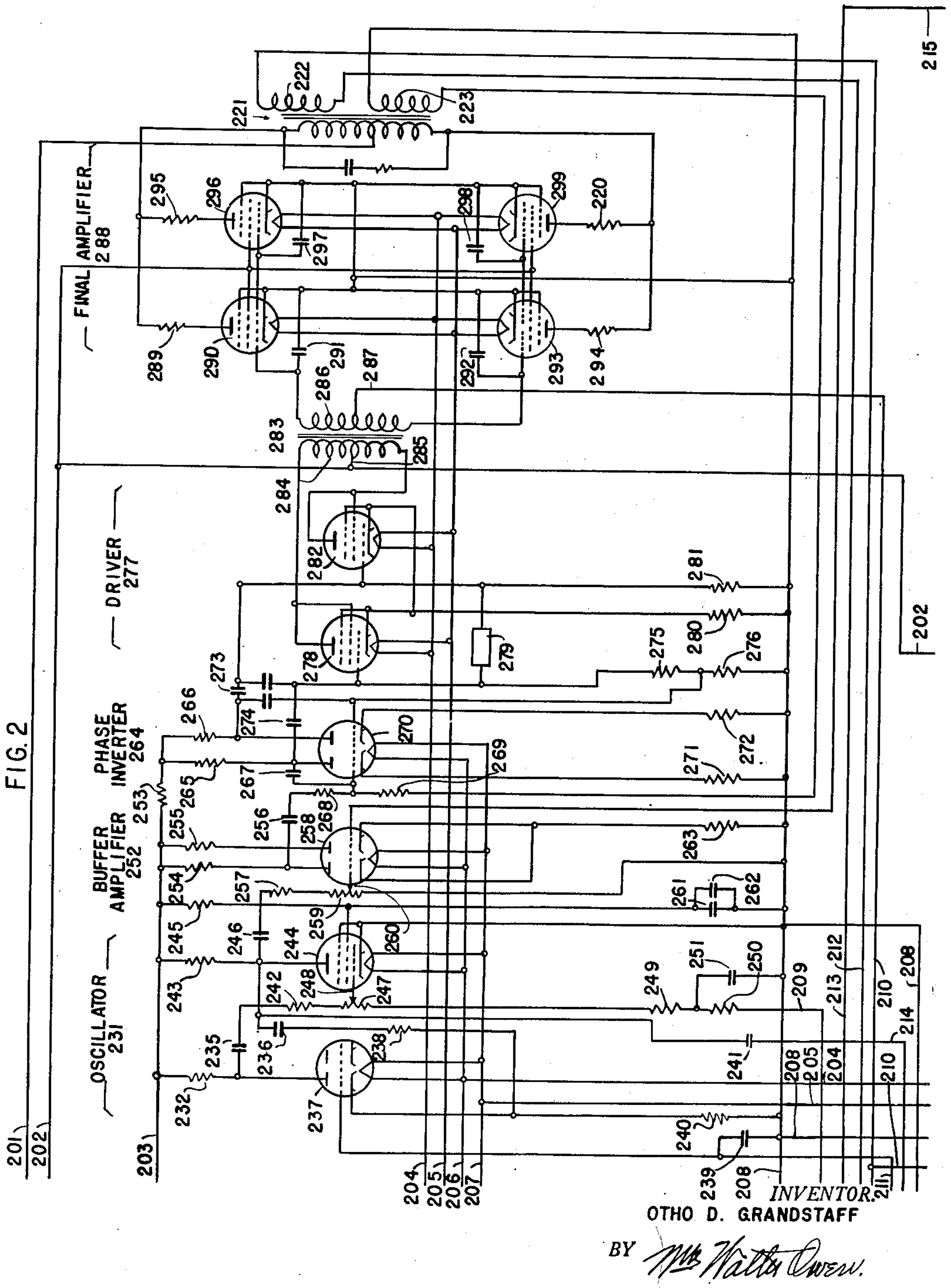
Figure 2 shows the oscillator, amplifier, and the output stages of the ringing generator.
Figure 3:
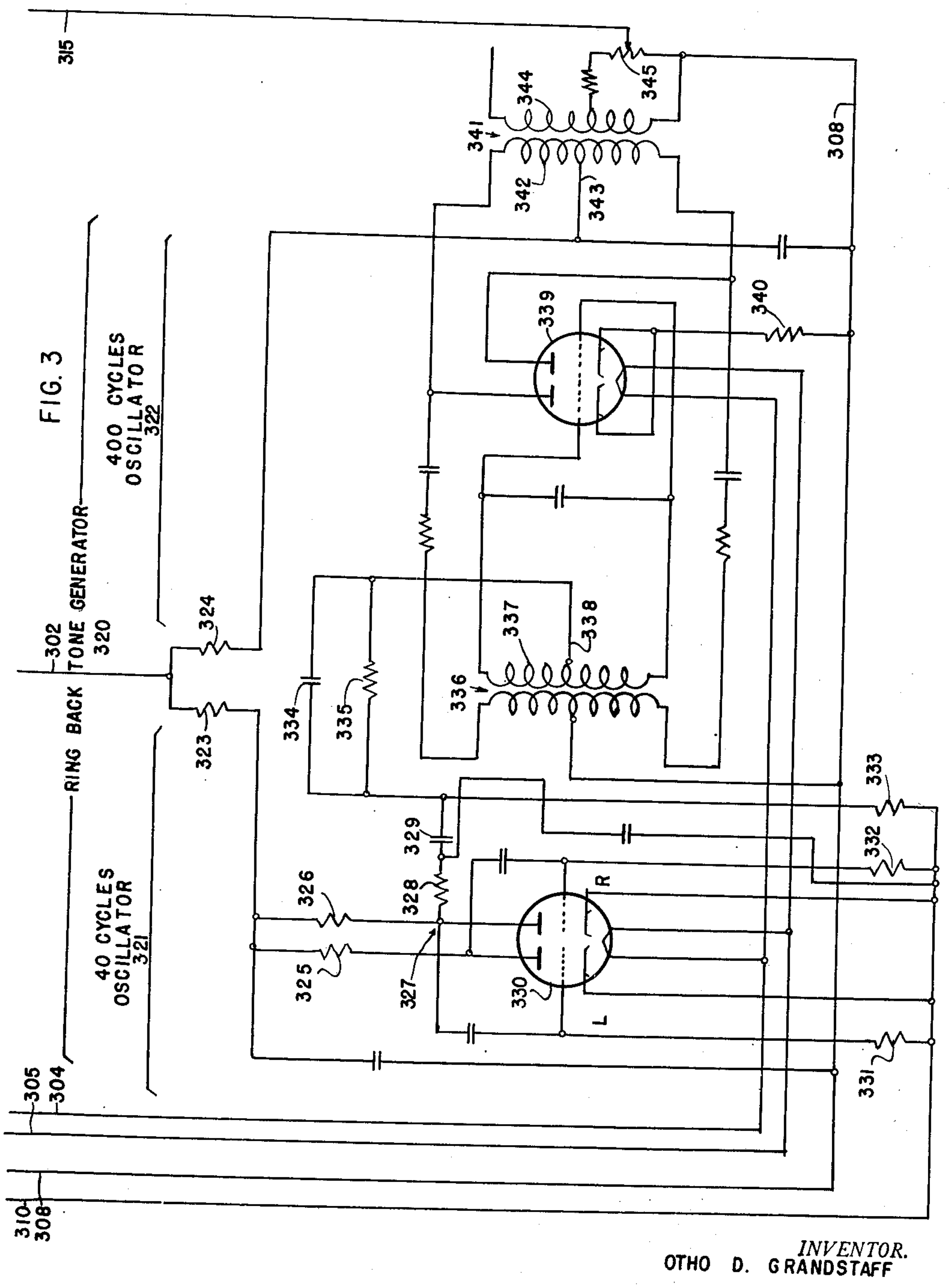
Figure 3 illustrates the ring back tone generator composed of two oscillator stages.
Figure 4:
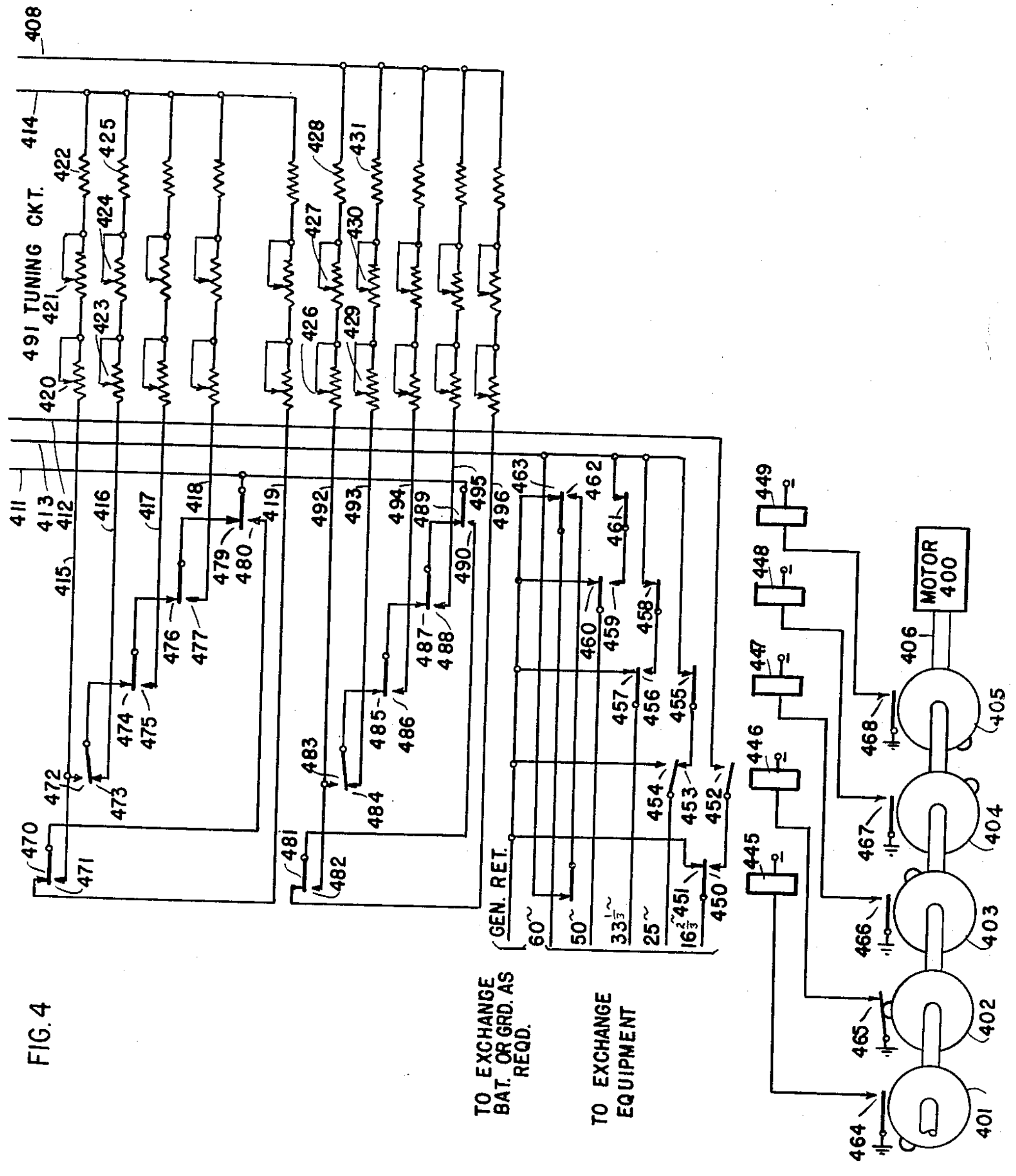
Figure 4 shows the tuning circuits, the switching control circuits, and the motor unit.

The circuit shown in Figure 2 illustrates the components comprising the electronic ringing generator which was designed to provide alternating current at any frequency required to operate standard telephone-type ringers. The generator may be used to provide continuous ringing current adaptable for code ringing or to provide a single frequency of the standard multiple, non-multiple, and multiple-of-ten series of frequencies usually from 16⅔ to 66⅔ cycles per second. The unit is tuned very easily by means of separate sets of potentiometers associated with each frequency range.

When used as a continuous un-interrupted generator of a single frequency, no external control equipment is required to operate the unit. The output is connected to the exchange equipment through a standard ringing interrupter as required.

Whenever the unit is used as a source of ringing currents of various frequencies, a switching arrangement is utilized for changing the tuned circuits connections to the oscillator stage of the ringing generator. Any desired length of a ringing cycle may be used that is within practical limits. Five separate tuning circuits are contained in the unit. Each tuning circuit is adjusted in conjunction with the oscillator so that the combination is responsible for generation of a particular ringing frequency. The switching circuit is comprised of a series of relays, one per each frequency, and has a dual function namely, to connect tuning circuits to the oscillator stage, and to connect the output of the ringing generator to a particular supply lead which is individual to that frequency. These switching relays are periodically operated in sequential manner. Present modification allows each relay to remain closed for approximately one second before the next succeeding relay is operated. Thus within a period of five seconds, ringing currents corresponding to five frequencies are generated. This cycle of multiple frequency generation is repeated every five seconds by using a motor which makes one revolution every five seconds. A series of cams are mounted on the motor shaft which are distributed along its length. Associated with each cam is a set of electrical contacts which, upon closure, establish an operating circuit for the particular relay. The relay in question connects its associated tuning circuit to the oscillator and opens the preceding tuning circuit so as to prevent the oscillator from being connected to two tuning circuits at the same time should the preceding operated relay be slow in returning to normal. The relay also connects the output of the ringing generator to the particular lead or equipment which is earmarked for receipt of that particular ringing frequency. As in the aforementioned operation, the relay similarly opens up the connection to the preceding supply lead so as to prevent accidental application of this particular ringing frequency to the preceding supply lead should the involved relay be slow to release.

The ring back tone generator comprises two oscillators. The modulating oscillator operates continuously at a frequency of 40 cps. The other oscillator operates intermittently at a frequency of 400 cps. The modulating oscillator uses a "twin" tube and operates in the well known manner of the multivibator type. Whenever a particular section of the "twin" tube conducts, the negative bias existing on the grids of the 400 cps. oscillator tube is overcome and the oscillator is made to generate the 400 cps. signal. Hence it is seen that the output of the ring back tone generator consists of a series of interrupted 400 cps. signals. This output is then fed into the buffer amplifier of the ringing generator where both signals, the ringing frequency and the ring back tone frequency, are mixed together and subsequently amplified.

The generator output leads for all frequencies are connected from the secondary of a single transformer. Taps may be available to provide any desired voltage for each frequency. A portion of the output signal is taken off from another secondary and fed back into the ringing generator for the purpose of maintaining the output within a range of predetermined values thereby providing regulation.

The undesirable electrical disturbances which are created by the switching operations involving the oscillator and the tuning circuits are suppressed by use of a non-linear resistor. This type of resistor is voltage sensitive and is suitable for suppressing the transient voltage excesses by offering, practically instantaneously, a low impedance path resulting in dissipation of the energy. The resistor is of the type commonly known as silicon carbide resistor. It is connected to one of the intermediate stages of the ringing generator where it is most effective in suppressing the undesirable voltages.

The output is comprised of alternating currents which are sinusoidal in character and contains no stray frequencies which have a tendency to create operating difficulties due to cross-coupling with other lines in proximity.

A detailed description of this electronic ringing generator will now be given. The commercial source of power such as 115 volts, 60 cycle A. C. is connected across the primary winding 112 of transformer 111 and also across the primary winding 113 of transformer 114. Associated with the secondary windings 115, 116 and 118 of transformer 111 are two full-wave rectifying circuit which together constitute the main power supply 150. One of these rectifier circuits comprises two full-wave high-vacuum rectifier tubes, 124 and 130, such as the commercial 5U4-G. The plates of tube 124 are connected in multiple to increase the power rating as also are the plates of tube 130. The plates of tube 124 are connected to one side of the secondary winding 116 of transformer 111 while the plates of tube 130 are connected to the opposite end of this secondary winding 116, the secondary winding 116 having a center tap 117 connected to chassis ground over lead 108. Secondary winding 115 of transformer 111 is connected to the filaments of tubes 124 and 130 and supplies heater current thereto. The D. C. output of this rectifier circuit supplies plate voltage for the final amplifier tubes 290, 293, 296 and 299. Inductor 127 and condenser 128 form a parallel resonant circuit and act to suppress the 120 cycle component of the rectified current output. The output is further smoothed by condensers 143 and 129. This is a low-impedance network filter which aids in maintaining a constant output voltage from no load to full load output. A resistor 142 is connected across condenser 143 and serves as a bleeder resistor to discharge condenser 143 when the power is turned off.

The second rectifier circuit associated with the secondary windings of transformer 111 employs one tube 131 similar to tubes 124 and 130, the plates of which are connected by taps to the secondary winding 116 of transformer 111. Secondary winding 118 of transformer 111 supplies filament current to tube 131. This second rectifier circuit supplies plate and screen grid voltages for the driver stages of this system, plate voltage for the ring-back tone generator and screen grid voltage for the final amplifier tubes, which components of this system will be subsequently described. The D. C. output of tube 131 is smoothed out by the filter comprising inductor 132 and condensers 133 and 134. Again, this is a low impedance type filter which maintains good voltage regulation. A resistor 135 is connected across condenser 134 and serves as a bleeder resistor to discharge condenser 134 when the power is turned off.

Transformer 114 is associated with a second or auxiliary power supply circuit 125 which is used to supply plate voltage for the low power stages of this system. This isolates the frequency generator stages from any effects of changes in output load. This power supply circuit 125 comprises a full-wave rectifier tube 126 which is similar to the rectified tubes 124, 130 and 131. The plates of tube 126 are connected to opposite ends of the secondary winding 120 of transformer 114, this winding 120 having a connection from a center tap 121 thereon through condenser 139 in parallel with both resistors 140 and 141 to chassis ground. The filament on this tube 126 is connected across secondary winding 122 which supplies heater current thereto, and is also connected to chassis ground through inductor 136 and through condenser 137 in parallel with resistor 138. The rectified output of tube 126 is smoothed by the choke input filter consisting of inductor 136 and condenser 137. Resistor 138 serves as a bleeder resistor, discharging condenser 137 when the power is turned off, and also helps to maintain a constant voltage output. The condenser 139 and resistors 140 and 141 in parallel therewith, which are connected between chassis group and the center tap 121 of secondary winding 120 provide a negative potential with respect to ground which is employed as a fixed bias voltage for the final amplifier and oscillator tubes. Condenser 139 serves to filter the fixed bias voltage and resistors 140 and 141 discharge condenser 139 when the power is turned off. Secondary winding 123 of transformer 114 supplies heater current for the tubes included in the oscillator, buffer amplifier and phase inverter stages.

The oscillator stage 231 comprises two vacuum tubes, 237 and 244, one of which may be the commercial 6SN7GT type and the other the 6V6GT type. Only one section of the 6SN7 tube is used. These two tubes 237 and 244 and their associated resistors and condensers are so connected as to form a Wien bridge type of resistance capacitance oscillator.

The cathode-plate circuit of the active section of tube 237 includes the plate resistor 232 and the cathode-bias resistor 240. The control grid of tube 237 is connected through condenser 239 to ground and is also connected through a pair of variable resistors connected in series, which are included in a tuning circuit to be hereinafter described, to ground; and is also connected through a second pair of variable resistors in series in the tuning circuit, and a condenser 241 to the plate of tube 244. The plate of tube 237 is connected to the control grid of tube 244 through a coupling condenser 235 in series with resistor 242 and variable resistor 247 including a tap 248 thereon. The control grid of tube 244 is also connected by the center tap 248 of resistor 247 through resistors 249 and 250 to the junction point of resistors 140 and 141, this circuit providing the fixed bias voltage for the tube 244. Resistor 247 is adjustable to permit adjusting the bias of tube 244 to obtain the desired output. The plate circuit of tube 244 includes the plate resistor 243. A grid by-pass condenser 251 is connected from the junction point of resistors 249 and 250 to ground. The screen grid voltage of tube 244 is obtained from resistor 245, condensers 261 and 262 being screen grid by-pass condensers. The plate of tube 244 is connected to the cathode of tube 237 through condenser 236 and resistor 238 in series. Tube 237 conducts and the changes in the plate current thereof are reflected in the control grid of tube 244 through condenser 235 and resistor 242. Tube 244 amplifies these changes. A portion of this amplified signal in tube 244 is regeneratively fed back to the grid of tube 237 through condenser 241, in series with the variable resistors in the tuning circuit, and the break contacts of a relay in the tuning circuit. The resulting change in the voltage on the control grid of tube 237 causes a corresponding change in the plate current thereof which in turn causes a change in the voltage of the control grid of tube 244 and a resulting change in the plate current of tube 244 which in turn results in a change in the control grid voltage of tube 237. A periodic motion is thus established and the frequency of oscillation in the output of this Wien bridge oscillator 231 will be determined by the setting of the variable resistors such as 420 and 421 in the tuning circuit 491. The resistance network of the tuning circuit and condensers 239 and 241 determine the phase and the magnitude of the feed back voltage. Another portion of the output of the amplifier tube 244 is degeneratively fed back to the cathode of tube 237 through condenser 236 and resistor 238 to improve the output wave form and increase the stability of the oscillator. The output of this oscillator 231 is connected to the control grid of the buffer amplifier tube 258 through condenser 246, resistor 257 and center tap 260 of resistor 259.

The buffer amplifier stage 252 comprises the left half section of tube 258 and the purpose of this amplifier is to serve as an isolating stage to prevent the final amplifier feed-back circuit from affecting the oscillator stage 231. The cathode-plate circuit of this buffer amplifier section of tube 258 includes plate resistor 254 and cathode bias resistor 263. The output circuit of this buffer amplifier 258 is connected to the control grid of the amplifier section of the phase-inverter tube 270 through the coupling condenser 256 and resistor 268. The phase-inverter stage 264 which serves the function of converting the output from the buffer amplifier 258 into two out-of-phase components equal in magnitude for exciting the control grids of the driver tubes 278 and 282, comprises a two section tube 270, one section serving as an amplifier and the other section serving as a phase inverter. The cathode-plate circuit of the amplifier section of this tube 270 comprises plate resistors 265 and 253 and cathode bias resistor 271. The cathode-plate circuit of the phase inverter section of this tube 270 comprises plate resistors 266 and 253 and cathode bias resistor 272. As stated, the output voltage of the buffer amplifier tube 258 is applied to the control grid of the first or amplifier section of tube 270. The plate circuit of this section is connected through coupling condenser 274 to the control grid of one of the push-pull amplifier tubes 278, and is also connected through the condenser 274 and through resistors 275 and 276 to ground; the control grid of the phase inverter section of tube 270 is connected to the junction point of resistors 275 and 276. Thus, a portion of the output of the amplifier section of tube 270 is applied to the control grid of the phase-inverter section of tube 270. The plate of the phase-inverter section of tube 270 is connected by way of coupling condenser 273 to the control grid of the second push-pull amplifier 282. When the output voltage of the amplifier section of tube 270 swings in the positive direction, the plate current in the phase-inverter section of tube 270 increases, thus increasing the voltage drop across the plate resistor 266 which in turn causes the plate voltage of the phase-inverter to swing in the negative direction. Thus, when the output voltage of the amplifier section of tube 270 swings positive, the output voltage of the phase-inverter section swings negative and is therefore 180° out-of-phase with the output voltage of the amplifier section of tube 270. Resistors 275, 276 and 281 are of such values that the voltages applied to the grids to the push-pull amplifier tubes 278 and 282 are of equal magnitude.

The driver stage 277 of this electronic ringing generator employs two beam power amplifier tubes 278 and 282 such as the commercial 6V6GT tubes. These tubes are connected in push-pull, their plates being connected to opposite ends of the primary winding 284 of transformer 283, the center tap 285 of which is connected to the source of plate voltage, and their control grids are excited by signals equal in magnitude but 180° out of phase as previously stated. The plate-cathode circuit of tube 278 includes the cathode bias resistor 280.

The push-pull method of operation gives increased power output and eliminates distortion due to even order harmonics and hum caused by plate-voltage supply fluctuations. Transformer 283 has a step-down ratio to provide a low impedance driving source for the final amplifier tubes which take grid current at heavy load conditions.

The final amplifier stage 288 comprises four beam power amplifier tubes 290, 293, 296, 299, such as the commercial 6L6G tubes, connected to give a parallel push-pull amplifier circuit. The control grids of tubes 290 and 296 are connected to one end of the secondary winding 286 of transformer 283 and the control grids of tubes 293 and 299 are connected to the other end thereof, the center tap 287 on the secondary winding 286 being connected to the source of fixed bias voltage at the auxiliary power supply 125. Voltages of equal magnitude, 180° out-of-phase, are supplied to the control grids of each parallel combination, tubes 290 and 296 operating in parallel and tubes 293 and 299 operating in parallel. By-pass condensers 291, 292, 297 and 298 serve to suppress any high-frequency components. Resistors 289, 294, 295 and 220 are plate load equalizing resistors. The sine wave output appears across the secondary winding 222 of output transformer 221.

A second secondary winding 223 is included in transformer 221 and serves to furnish a negative feedback voltage to the grid of the amplifier section of tube 270 in the phase-inverter stage 264 through resistor 269. As the output load increases or decreases, a corresponding increase or decrease in amplification will take place in the amplifier section of tube 270 resulting in an increase or decrease in the output voltage at transformer 221. Thus, the output voltage is held automatically at a constant value as the load changes over a wide range.

This embodiment of the electronic ring generator was intended for use in supplying ringing current for telephone exchanges, and a ring back tone generator 320 is also provided to supply a single frequency of uniform magnitude for ring-back tone to a calling subscriber. Ring-back tone generator 320 supplies intervals of 400 cycle signals superimposed on the ringing signal at the output transformer 221. The ring-back tone generator 320 comprises two oscillator circuits, 321 and 322, one producing oscillations at 40 cycles per second and the other producing oscillations at 400 cycles per second. The 400 cycle oscillator 322 includes the tube 339 such as 6SN7G7, one plate of which is connected to one end of the primary winding 342 of transformer 341 and the other plate of which is connected to the other end of primary winding 342 and both leading through a center tap 343 and plate voltage dropping resistor 324 to the source of plate voltage. The plate-cathode circuits of this tube 339 include the cathode bias resistor 340. The control grids of this tube 339 are connected to opposite ends of the secondary winding 337 of transformer 336, the center tap 338 of which is connected through resistors 335 and 333 to a source of negative potential. This 400 cycle oscillator 339 is normally inoperative due to this negative potential on the grids.

The 40 cycle oscillator 321 comprises tube 330 such as 6SN7GT. One plate thereof is connected through plate resistor 325 and the other plate thereof is connected through plate resistor 326, and both connected to a source of plate voltage through plate voltage dropping resistor 323. The control grids thereof are connected to a source of negative biasing potential through resistors 331 and 332. The 40 cycle oscillator 321 is normally operating. This modulating oscillator 321 is of the well-known multivibrator type wherein one section of the tube 330 conducts while the other section of the same tube becomes biased off. Oscillations are started by momentary unbalance, say a more positive voltage existing on the L (left) section of tube 330 than on the grid of R (right) section of same tube. This voltage is amplified and reappears at the L grid to be reamplified. This is a cumulative and instantaneous action so that the L grid rises abruptly to a positive value, while the R grid potential just as suddenly becomes more negative than the cut-off value. As a result amplification ceases and L triode of tube 330 draws a heavy plate current while R triode takes no plate current. But this situation is only momentary because the leakage through the grid-leak resistance 332 of the R triode brings the grid potential on grid of R triode back to zero. When the negative potential on grid of R triode has dropped sufficiently so that amplification is possible, some minute voltage will start amplification in the R triode, operation of which is reverse to that previously described for the L triode. Whenever L triode conducts, plate of the R triode does not draw any current thereby resulting in a high positive potential at point 327 which is impressed therefrom across resistor 328, condenser 329, resistor 335 to the center-tap 338 of the secondary winding 337, then to the grids of tube 339. This causes tube 339 together with its associated components to break into oscillations of 400 cycles per second, the output of which is taken from the secondary winding 344 of the output transformer 341 via the variable resistor 345. This modulated 400 cps. signal affects the current flow through the cathode resistor 263 in the buffer amplifier 252 causing the signal to be mixed and amplified together with the ringing frequency, the combination of which appears at the output transformer 221. As soon as the L triode of tube 330 ceases to conduct, the R triode begins to conduct and the positive voltage at point 327 drops to such an extent that the grids on tube 339 assume a bias which precludes further oscillation of tube 339. The result of the operation of the ring back tone generator 320 is that a series of discontinuous spurts consisting of 400 cycle per second oscillations are impressed upon the R grid of the buffer amplifier tube 258. The rate of occurrence of these spurts is governed by the modulating oscillator 321 which corresponds to 40 cycles per second. The above operation is analogous to that known in CW wireless telegraphy.

This particular embodiment of the invention is designed for use in a telephone exchange where usually 5 different ringing frequencies are required such as 16⅔, 25, 33⅓, 50 and 66⅔ cycles per second. In the telephone exchange the ringing frequency is intermittently connected to the telephone lines for a period of one second out of every 5 seconds. A frequency selector and output control circuit are provided and comprise a motor 400 which turns at the rate of one revolution every five seconds and 5 cams 401–405 fixedly mounted on the motor shaft 406 with which are associated five pairs of contact springs 464–468 respectively. The cams are so arranged as to close the spring contacts successively in one second periods, each pair of contacts being closed once per each five second period. These pairs of spring contacts 464–468, when closed, cause associated relays 445–449 to operate. These relays operate successively and in sequence during a five second period to tune the electronic ringing generator to produce the five different ringing frequencies and to close the output circuit to the exchange equipment.

To illustrate how the various components cooperate in producing a desired result, a single operation will be indicated. The protuberance on the cam 402 is in its uppermost position resulting in closure of contacts 465. As a result, relay 446 is operated over the following path: ground through contacts 465 and through the winding on relay 446 to −battery. Make contacts 473 close so that a first portion of the oscillatory circuit is established for generation of 25 cps. over the following: the left grid of tube 237 over the line 211, line 411, through the break contacts 479, through the break contacts 476, through the break contacts 474, through the make contacts 473 on relay 446 over the line 416 through the "fine" Vernier potentiometer 423 through the "coarse" Vernier potentiometer 424, through the resistor 425, over the line 414, over the line 214 through condenser 241 to the plate of tube 244. Contacts 472 open and prevent accidental paralleling of the previous 16⅔ cps. oscillatory tuning circuit to the present 25 cps. tuning circuit should contacts 471 be slow in opening up. The second portion of the oscillatory circuit is completed when make contacts 484 on relay 446 close and establish a path from the left grid of tube 237, over the line 211, over the line 411, through the break contacts 489, through the break contacts 487, through the break contacts 485, through the make contacts 484, over the line 493, through the potentiometer 429, through the potentiometer 430, through the resistor 431, over the line 408, over line 208 to the cathode of tube 244. Contacts 483 open and prevent accidental connection to the previous tuning circuit should the make contacts 482 on relay 445 be slow in opening. Make contacts 453 on relay 446 close and allow the 25 cps. frequency signal generated in the electronic harmonic generator to be sent over to the desired subscriber equipment. Contacts 452 and contacts 454 open so as to prevent accidental application of the adjacent frequencies, 16⅔ cps. and 33⅓ cps. over the 25 cps. line. It is to be noted that contacts 452 will break first before contacts 453 will make so as to prevent application of the 25 cps. frequency signal to the previous line which is to receive only the 16⅔ cps. frequency signal. Operation of the other components comprising the other ringing frequency circuits is similar to that described for the 25 cps. case.

It will be realized that as the cams make and break energizing circuits to the various relays, the latter in operating and releasing will cause a distinct break between the oscillation periods. Although this is of short duration, the electrical disturbance created during the switching operation from one tuning circuit to another is of such magnitude as to be painful and irritating to the aural sense of the calling party, and to introduce interference in other circuits in vicinity by the cross-coupling phenomenon. To overcome this undesirable element, a non-linear resistor, of the type known as silicon carbide, is used to suppress any transient voltages arising out of this switching operation. This non-linear resistor 279 is connected between the two grids of tubes 270 and 282 as follows: the left grid of tube 270 through condenser 267, through condenser 274, through the resistor 279 and to the grid of tube 282. This type of resistor 279 exhibits a high resistance to the ordinary operating voltage, but as soon as a high transient voltage appears across the resistor, it exhibits a low resistance. This drop in resistance upon appearance of abnormal voltage is not linear but is logarithmic with respect to the voltage and presents an effective method of combating the undesirable characteristics of transients.

While there has been described what is at present considered to be the preferred embodiment of the invention it will be understood that various modifications may be made herein and it is intended to cover in the appended claims all such modifications as fall within the true spirit and scope of the invention.

What is claimed is:

1. An electronic generator for connection to a plurality of ringing devices each responsive to a different frequency, comprising a plurality of circuits each tuned to a distinct ringing frequency, actuating means, means operated in response to operation of said actuating means for switching in cyclic succession the ringing generator from one tuned circuit to another and for switching the output thereof to said ringing device, said ringing generator operable responsive to operation of said switching means for generating a particular ringing frequency associated with each tuned circuit when connected thereto, means for generating a ring back tone signal, control means operated by said ringing generator for controlling the operation of said ring back tone means, means effective in response to receipt of said ring back tone signal for superimposing said signal upon each ringing frequency signal, means for amplifying the composite signal, and means for suppressing the transient voltages due to said switching operations, said suppressing means effective in response to receipt of said transient voltages to suppress said voltages whereby the composite output is free of deleterious foreign frequencies.

2. In a combination with an electronic ringing generator including a plurality of tuning circuits each operable at a diffierent frequency, means for sequentially switching the ringing generator from one tuning circuit to another in an established periodic manner, said ringing generator operable responsive to operation of said switching means for generating a signal of particular frequency corresponding to said connected tuned circuit, means for generating a low frequency signal, other means for generating a high frequency signal, said other mans inetrmittently operated in response to operation of the low frequency generating means for generating an intermittent high frequency signal, means operable responsive to receipt of said particular frequency signal and said intermittent high frequency signal for combining and amplifying said signals whereby the output is comprised of the two frequencies.

3. In a combination as claimed in claim 2, means for suppressing transient voltages due to the switching operation, said means effective in response to receipt of said voltage disturbances to suppress and modify their effects whereby the output is essentially free of any undesired voltage variations.

4. In a combination as claimed in claim 3, means for controlling the output of said ringing generator, said means effective in response to a drop in said output for bringing the output back to normal and said means also effective in response to a rise in said output for bringing the output back to normal whereby the output remains substantially uniform during switching to various external equipment.

5. An electronic ringing generator comprised of a plurality of stages serially common to a network of tuning circuits each of said tuning circuits tunable to a different ringing frequency, means externally operated for switching sequentially from one tuning circuit to another in a repetitive manner, modulating means, ring back tone means, said ring back tone means operated in response to operation of said modulating means, said modulating means effective in modulating a ring back tone signal generated by the ring back tone means, means operable responsive to operation of said ringing generator for introduction of said modulated signal into one of the stages of said electronic ringing generator, means operated in response to receipt of said signal for simultaneously mixing and amplifying both the ringing signal and the ring back tone signal whereby the output of the ringing generator is comprised of two frequencies; a ringing frequency and a ring back tone frequency.

6. In a combination as claimed in claim 5, suppressor means connected to at least one of said stages, said suppressor means effective in response to receipt of voltage transients due to the switching operation for suppressing said transients whereby the output consists of the ringing frequency and the ring back tone frequency signals substantially devoid of the voltage disturbances.

7. In a combination as claimed in claim 6, means for controlling the output signal so that it remains substantially of uniform magnitude, said means effective in response to a drop in the output for bringing the output back to its former status, said means also effective in response to a rise in the output for bringing the output back to its former status whereby the output of said ringing generator remains substantially uniform regardless of the degree of loading.

8. In a combination with an electronic amplifier comprised of a plurality of stages, one of said stages receiving input from a source of variable frequency signals, means for generating a modulating signal, other means for generating a distinct frequency signal, said other means operated intermittently in response to continuous operation of said modulating means for introduction of said modulated distinct frequency signal into one of said stages, means operable responsive to receipt of the input signal and said modulated signal for mixing and amplifying said signals whereby the output consists of a combination of the two frequencies.

9. In a combination as claimed in claim 8, suppressor means sensitive to voltage magnitudes deviating from the normal voltage of said input signal, said suppressor means connected to at least one of the stages of said amplifier, said suppressor means effective in response to receipt of voltage deviations from said normal signal voltage for suppressing the voltage abnormalities to keep the output substantially free of said abnormal voltage variations.

10. An electronic ring back tone generator comprised of a plurality of oscillator stages each operable at a different frequency, means responsive to operation of one of said stages for generating a low frequency signal, means in another stage operated in response to receipt of only one-half of each alternation of said low frequency signal for generating a high frequency signal whereby the ring back tone consists of a high frequency signal modulated by the low frequency signal.

OTHO D. GRANDSTAFF.

References Cited in the file of this patent

UNITED STATES PATENTS

| Number | Name | Date |
|---|---|---|
| 2,457,131 | Curtis | Dec. 28, 1948 |
| 2,502,687 | Weiner | Apr. 4, 1950 |
| 2,561,747 | Merrill, Jr. et al. | July 24, 1951 |
| 2,581,056 | Walmsley et al. | Jan. 1, 1952 |
| 2,585,022 | Lewis | Feb. 12, 1952 |